(12) United States Patent
Zhang

(10) Patent No.: US 11,870,472 B2
(45) Date of Patent: Jan. 9, 2024

(54) RADIO FREQUENCY STRUCTURE AND TERMINAL DEVICE

(71) Applicant: VIVO MOBILE COMMUNICATION CO., LTD., Guangdong (CN)

(72) Inventor: Sha Zhang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 368 days.

(21) Appl. No.: 17/333,700

(22) Filed: May 28, 2021

(65) Prior Publication Data

US 2021/0288676 A1    Sep. 16, 2021

Related U.S. Application Data

(63) Continuation of application No. PCT/CN2019/117079, filed on Nov. 11, 2019.

(30) Foreign Application Priority Data

Nov. 30, 2018   (CN) .......................... 201811452365.2

(51) Int. Cl.
   *H04L 5/12*      (2006.01)
   *H04B 1/00*      (2006.01)
   *H04B 7/0404*    (2017.01)

(52) U.S. Cl.
   CPC ........... *H04B 1/0064* (2013.01); *H04B 1/006* (2013.01); *H04B 1/0067* (2013.01); *H04B 7/0404* (2013.01)

(58) Field of Classification Search
   CPC .... H04B 1/0064; H04B 1/006; H04B 1/0067; H04B 7/0404; H04B 7/0602; H04B 1/40
   (Continued)

(56) References Cited

U.S. PATENT DOCUMENTS

2014/0349587 A1   11/2014   Frenger et al.
2019/0288718 A1    9/2019   Bai
(Continued)

FOREIGN PATENT DOCUMENTS

CN    105827269 A    8/2016
CN    106656248 A    5/2017
(Continued)

OTHER PUBLICATIONS

International Search Report and Written Opinion of the International Searching Authority regarding International Patent Application No. PCT/CN2019/117079, dated Jan. 22, 2020. Translation provided by Bohui Intellectual Property.
(Continued)

*Primary Examiner* — Helene E Tayong
(74) *Attorney, Agent, or Firm* — Harness, Dickey & Pierce, P.L.C.

(57) ABSTRACT

A radio frequency structure includes: a radio frequency front-end module, a switch module, and an antenna module. The radio frequency front-end module includes a radio frequency transceiver, and a first processing module, a second processing module, a third processing module, a fourth processing module, and a fifth processing module that are connected to the radio frequency transceiver. The switch module includes a first switch module and a second switch module. The antenna module includes a first antenna, a second antenna, a third antenna, and a fourth antenna that are used to receive or send radio frequency signals.

18 Claims, 9 Drawing Sheets

(58) Field of Classification Search
USPC .......................................................... 375/262
See application file for complete search history.

(56) References Cited

U.S. PATENT DOCUMENTS

2019/0288732 A1    9/2019  Bai
2019/0288734 A1    9/2019  Bai

FOREIGN PATENT DOCUMENTS

| CN | 108199725 A | 6/2018 |
| CN | 108462506 A | 8/2018 |
| CN | 108494413 A | 9/2018 |
| CN | 108649971 A | 10/2018 |
| CN | 109274397 A | 1/2019 |

OTHER PUBLICATIONS

"Discussion on LTE UE capabilities for Rel-15 NR-LTE dual mode UEs," Vivo, 3GPP TSG RAN Meeting #81, RP-181662, dated Sep. 13, 2018.
First Office Action regarding Chinese Patent Application No. 201811452365.2, dated Jul. 31, 2019. Translation provided by Bohui Intellectual Property.
Second Office Action regarding Chinese Patent Application No. 201811452365.2, dated Apr. 2, 2020. Translation provided by Bohui Intellectual Property.

RADIO FREQUENCY STRUCTURE AND TERMINAL DEVICE

CROSS-REFERENCE TO RELATED APPLICATIONS

This application is a Bypass Continuation Application of PCT/CN2019/117079, filed on Nov. 11, 2019, which claims priority to Chinese Patent Application No. 201811452365.2 filed on Nov. 30, 2018, which are incorporated herein by reference in their entirety.

TECHNICAL FIELD

Embodiments of the present disclosure relate to the field of communications technologies, and in particular, to a radio frequency structure and a terminal device.

BACKGROUND

Two networking manners are used in a process of developing and constructing a 5G network: non-standalone (NSA) and standalone (SA).

The two networking manners impose different requirements on technical requirements and implementations. The NSA mode is used as an example and the following technical requirements need to be met: for example, (1). communication is performed in long term evolution (LTE) and 5G new radio (NR) based on a dual connectivity (DC) manner, in other words, communication can be performed on an LTE band and an NR band at the same time; (2) the NR band needs to support a 1T4R (1-transmit 4-receive) sounding reference signal (SRS) antenna round-transmit technology. In addition, when a radio frequency structure works only in an LTE mode, it is also expected to support dual-antenna or multi-antenna switching and downlink 4*4 multiple-input multiple-output (MIMO).

SUMMARY

According to a first aspect, an embodiment of the present disclosure provides a radio frequency structure, including: a radio frequency front-end module, a switch module, and an antenna module, where the radio frequency front-end module includes a radio frequency transceiver, and a first processing module, a second processing module, a third processing module, a fourth processing module, and a fifth processing module that are connected to the radio frequency transceiver;

the switch module includes a first switch module and a second switch module;

the antenna module includes a first antenna, a second antenna, a third antenna, and a fourth antenna that are used to receive or send radio frequency signals;

a second end of the first processing module is connected to a first end of the first switch module, a second end of the second processing module is connected to a second end of the first switch module, and a second end of the third processing module is connected to a third end of the first switch module;

a second end of the fourth processing module is connected to a second end of the second switch module, and a second end of the fifth processing module is connected to a third end of the second switch module;

a fourth end of the first switch module is connected to the first antenna, a fourth end of the second switch module is connected to the second antenna, a fifth end of the second processing module is connected to the third antenna, and a sixth end of the second switch module is connected to the fourth antenna;

a fifth end of the first switch module is connected to a first end of the second switch module;

the first processing module is configured to receive or send a signal of a first network, and/or configured to receive a signal of a second network;

the second processing module is configured to receive or send a signal of the second network;

the third processing module is configured to receive a signal of the first network;

the fourth processing module is configured to receive a signal of the first network and/or a signal of the second network; and the fifth processing module is configured to receive a signal of the first network and/or a signal of the second network.

According to a second aspect, an embodiment of the present disclosure provides a radio frequency structure, including: a radio frequency front-end module, a switch module, and an antenna module, where the radio frequency front-end module includes a radio frequency transceiver, and a first processing module, a second processing module, a third processing module, a fourth processing module, and a fifth processing module that are connected to the radio frequency transceiver;

the switch module includes a first switch module and a second switch module;

the antenna module includes a first antenna, a second antenna, a third antenna, and a fourth antenna that are used to receive or send radio frequency signals;

a second end of the first processing module is connected to a first end of the first switch module, a second end of the second processing module is connected to a second end of the first switch module, and a second end of the third processing module is connected to a third end of the first switch module;

a second end of the fourth processing module is connected to a second end of the second switch module, and a second end of the fifth processing module is connected to a third end of the second switch module;

a fourth end of the first switch module is connected to the first antenna, a fifth end of the first switch module is connected to the second antenna, a fourth end of the second switch module is connected to the third antenna, and a fifth end of the second switch module is connected to the fourth antenna;

a sixth end of the first switch module is connected to a first end of the second switch module;

the first processing module is configured to send or receive a signal of a first network, and/or configured to receive a signal of a second network;

the second processing module is configured to receive or send a signal of the second network;

the third processing module is configured to receive a signal of the first network and/or a signal of the second network;

the fourth processing module is configured to receive a signal of the first network and/or a signal of the second network; and the fifth processing module is configured to receive a signal of the first network and/or a signal of the second network.

According to a third aspect, an embodiment of the present disclosure further provides a terminal device, including: the radio frequency structure in the first aspect or the radio frequency structure in the second aspect.

DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

The term "and/or" in this specification describes an association relationship of associated objects, indicating that three relationships may exist. For example, A and/or B may indicate three cases: Only A exists, both A and B exist, and only B exists. A character "/" in this specification indicates an "or" relationship between associated objects. For example, AB indicates A or B.

In the related technologies, there are multiple radio frequency structures in the NSA mode. However, relatively many antennas are used in the structures. For example, in some structures, a 4-antenna design is used for each of the LTE and the NR. As a result, this increases the complexity of antenna design.

Figure 1:
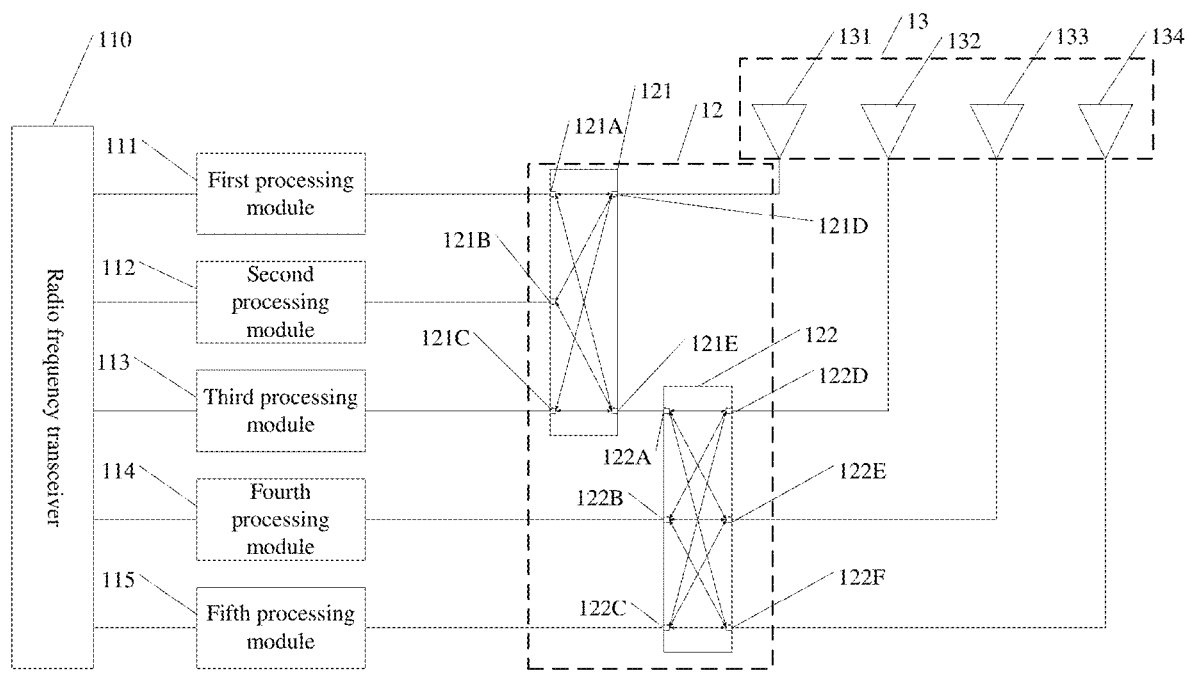
FIG. 1 is a first schematic diagram of a radio frequency structure according to an embodiment of the present disclosure.

FIG. 1 is a schematic diagram of a radio frequency structure according to an embodiment of the present disclosure. As shown in FIG. 1, the radio frequency structure may include a radio frequency front-end module, a switch module 12, and an antenna module 13.

The radio frequency front-end module includes a radio frequency transceiver 110, a first processing module 111, a second processing module 112, a third processing module 113, a fourth processing module 114, and a fifth processing module 115.

The switch module 12 includes a first switch module 121 and a second switch module 122.

The antenna module 13 includes a first antenna 131, a second antenna 132, a third antenna 133, and a fourth antenna 134 that are used to receive or send radio frequency signals.

A second end of the first processing module 111 is connected to a first end 121A of the first switch module 121, a second end of the second processing module 112 is connected to a second end 121B of the first switch module 121, and a second end of the third processing module 113 is connected to a third end 121C of the first switch module 121.

A second end of the fourth processing module 114 is connected to a second end 122B of the second switch module 122, and a second end of the fifth processing module 115 is connected to a third end 122C of the second switch module 122.

A fourth end 121D of the first switch module 121 is connected to the first antenna 131, a fourth end 122D of the second switch module 122 is connected to the second antenna 132, a fifth end 122E of the second switch module 122 is connected to the third antenna 133, and a sixth end 122F of the second switch module 122 is connected to the fourth antenna 134.

A fifth end 121E of the first switch module 121 is connected to a first end 122A of the second switch module 122.

The first processing module 111 is configured to receive or send a signal of a first network, and/or configured to receive a signal of a second network.

The second processing module 112 is configured to receive or send a signal of the second network.

The third processing module 113 is configured to receive a signal of the first network.

The fourth processing module 114 is configured to receive a signal of the first network and/or a signal of the second network.

The fifth processing module 115 is configured to receive a signal of the first network and/or a signal of the second network.

In the embodiments of the present disclosure, using an antenna module including four antennas can meet a technical requirement in an NSA mode. Therefore, compared with the related technologies, a quantity of antennas is reduced by using this embodiment of the present disclosure, thereby reducing the complexity of antenna design.

The following describes in detail the radio frequency structure in this embodiment of the present disclosure by using an example in which the first network is LTE and the second network is NR.

Optionally, the first processing module corresponds to LTE TRx (transceive)/NR receive (Rx), the second processing module corresponds to an NR TRx module, the third processing module corresponds to an LTE receive (Rx) module, the fourth processing module corresponds to a first LTE/NR receive module (LTE/NR Rx Module #1), and the fifth processing module corresponds to a second LTE/NR receive module (LTE/NR Rx Module #3).

Figure 2:
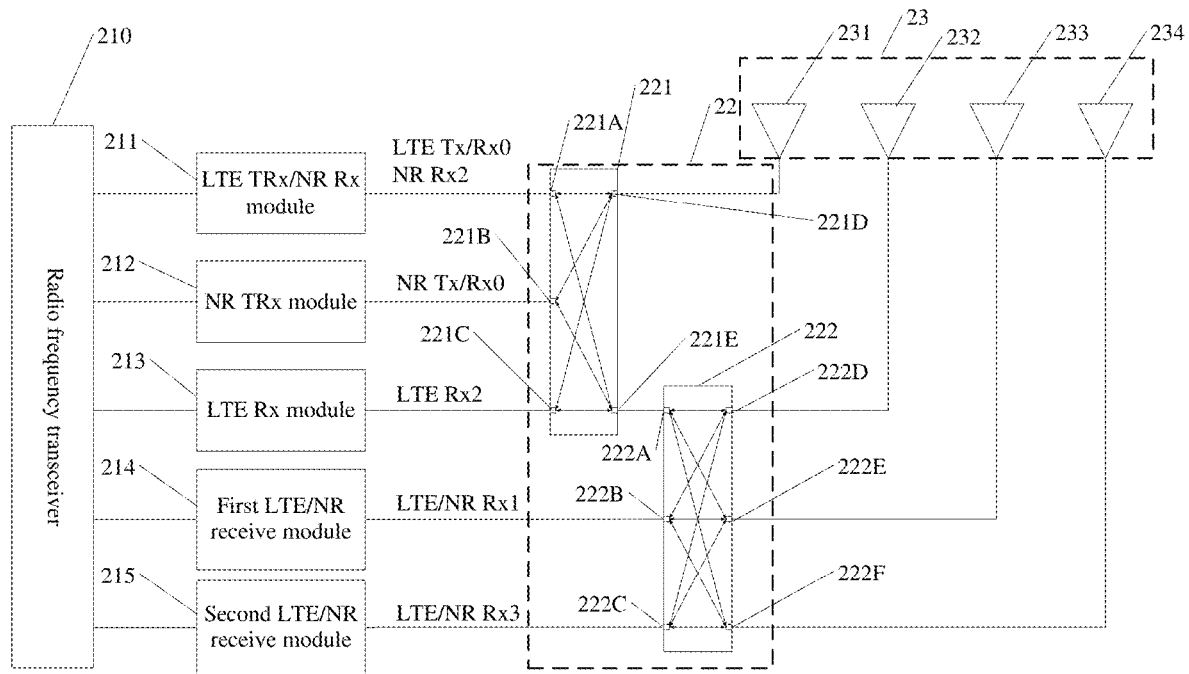
FIG. 2 is a first schematic diagram of an antenna configuration according to an embodiment of the present disclosure.

FIG. 2 is a schematic diagram of a radio frequency structure according to an embodiment of the present disclosure. As shown in FIG. 2, the radio frequency structure may include a radio frequency front-end module, a switch module 22, and an antenna module 23.

The radio frequency front-end module includes a radio frequency transceiver 210, LTE TRx (transceive)/NR receive (Rx) module 211, an NR TRx module 212, an LTE receive (Rx) module 213, a first LTE/NR receive module (LTE/NR Rx Module #1) 214, and a second LTE/NR receive module (LTE/NR Rx Module #3) 215.

The switch module 22 includes a first switch module 221 and a second switch module 222.

The antenna module 23 includes a first antenna (ANT0) 231, a second antenna (ANT1) 232, a third antenna (ANT2) 233, and a fourth antenna (ANT3) 234 that are used to receive or send radio frequency signals.

As shown in FIG. 2, a second end of the LTE TRx/NR receive module 211, a second end of the NR TRx module 212, and a second end of the LTE receive module 213 are respectively connected to a first end 221A, a second end 221B, and a third end 221C of the first switch module 221.

A fifth end 221E of the first switch module 221, a second end of the first LTE/NR receive module 214, and a second end of the second LTE/NR receive module 215 are respectively connected to a first end 222A, a second end 222B, and a third end 222C of the second switch module 222.

A fourth end 221D of the first switch module is connected to the first antenna 231, and a fourth end 222D, a fifth end 222E, and a sixth end 222F of the second switch module 222 are respectively connected to the second antenna 232, the third antenna 233, and the fourth antenna 234.

The LTE TRx/NR receive module 211 is configured to receive or send a signal of the LTE and/or configured to receive a signal of the NR.

The NR TRx module 212 is configured to receive or send a signal of the NR.

The LTE receive module 213 is configured to receive a signal of the LTE.

The first LTE/NR receive module 214 is configured to receive a signal of the LTE and/or the NR.

The second LTE/NR receive module 215 is configured to receive a signal of the LTE and/or the NR.

In this embodiment, 4-antenna switching and downlink (DL) 4*4 MIMO of the LTE can be implemented, and a 1T4R SRS antenna round-transmit technology on an NR band in the LTE and the NR in a case of EN-DC is supported.

In the embodiments of the present disclosure, using an antenna module including four antennas can meet a technical requirement in an NSA mode. Therefore, compared with the related technologies, a quantity of antennas is reduced by using this embodiment of the present disclosure, thereby reducing the complexity of antenna design.

When the radio frequency structure works only in the LTE, there may be the following four configurations, to implement 4-antenna switching in the LTE, and implement LTE DL 4*4 MIMO. The configurations are described in detail below with reference to different accompanying drawings.

Figure 3:
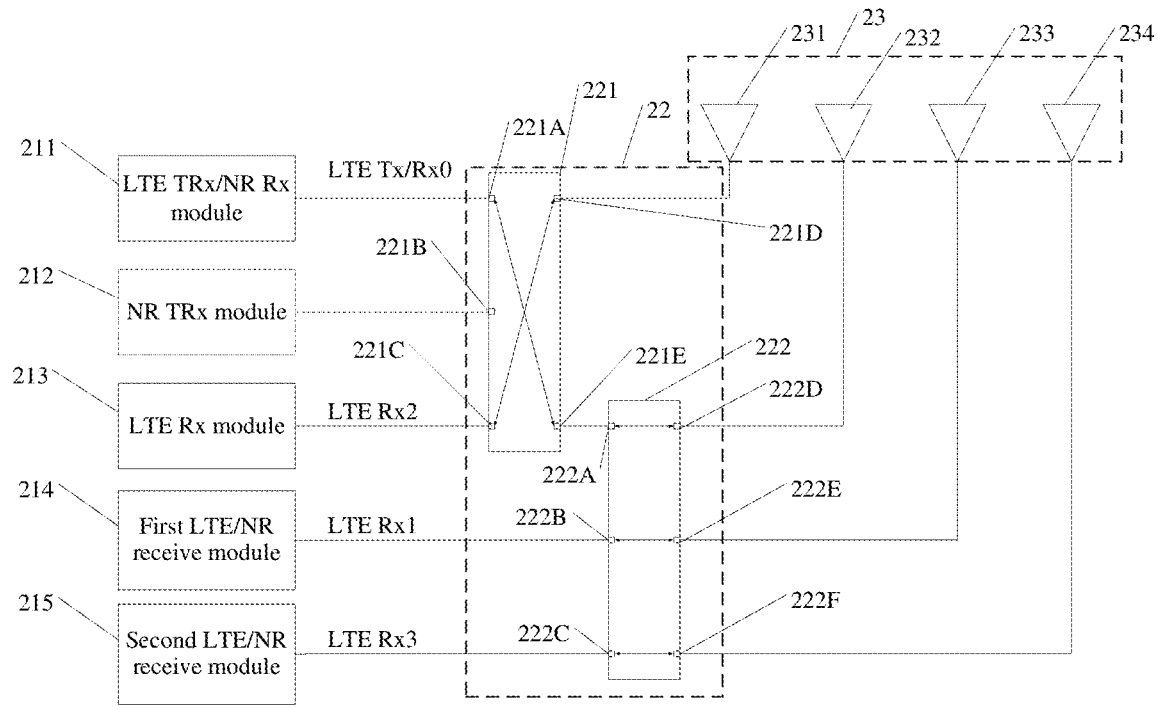
FIG. 3 is a second schematic diagram of an antenna configuration according to an embodiment of the present disclosure.

FIG. 3 shows a default configuration when the radio frequency structure works only in the LTE mode, to implement DL 4*4 MIMO. In FIG. 3, the first switch module and the second switch module are adjusted, so that the LTE TRx/NR receive module 211 is connected to the second antenna 232, and is configured to send a signal of the LTE or receive a first receive signal Rx0 of the LTE;

the LTE receive module 213 is connected to the first antenna 231, and is configured to receive a third receive signal Rx2 of the LTE;

the first LTE/NR receive module 214 is connected to the third antenna 233, and is configured to receive a second receive signal Rx1 of the LTE; and the second LTE/NR receive module 215 is connected to the fourth antenna 234, and is configured to receive a fourth receive signal Rx3 of the LTE.

Figure 4:
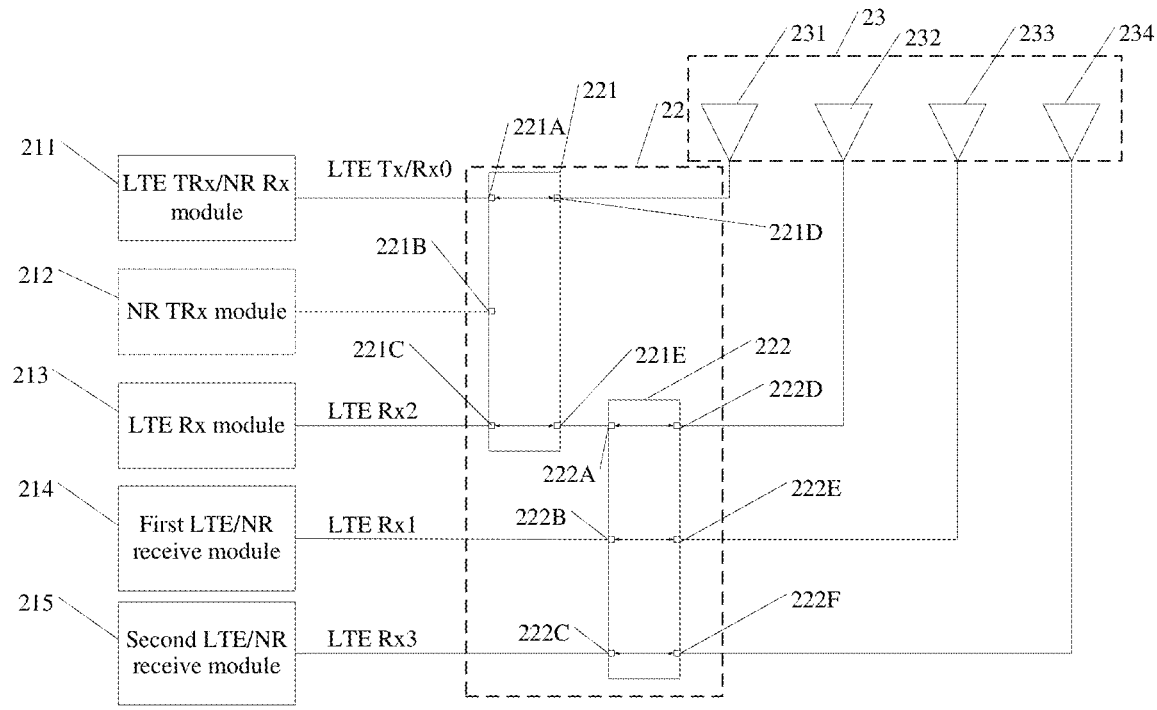
FIG. 4 is a third schematic diagram of an antenna configuration according to an embodiment of the present disclosure.

FIG. 4 shows a configuration when the radio frequency structure works only in the LTE mode, to implement DL 4*4 MIMO. In FIG. 4, the first switch module and the second switch module are adjusted, so that the LTE TRx/NR receive module 211 is connected to the first antenna 231, and is configured to send a signal of the LTE or receive a first receive signal Rx0 of the LTE;

the LTE receive module 213 is connected to the second antenna 232, and is configured to receive a third receive signal Rx2 of the LTE;

the first LTE/NR receive module 214 is connected to the third antenna 233, and is configured to receive a second receive signal Rx1 of the LTE; and the second LTE/NR receive module 215 is connected to the fourth antenna 234, and is configured to receive a fourth receive signal Rx3 of the LTE.

Compared with the configuration in FIG. 3, in this configuration, a configuration of the third antenna 233 (ANT2) and a configuration of the first antenna 231 (ANT0) are exchanged.

Figure 5:
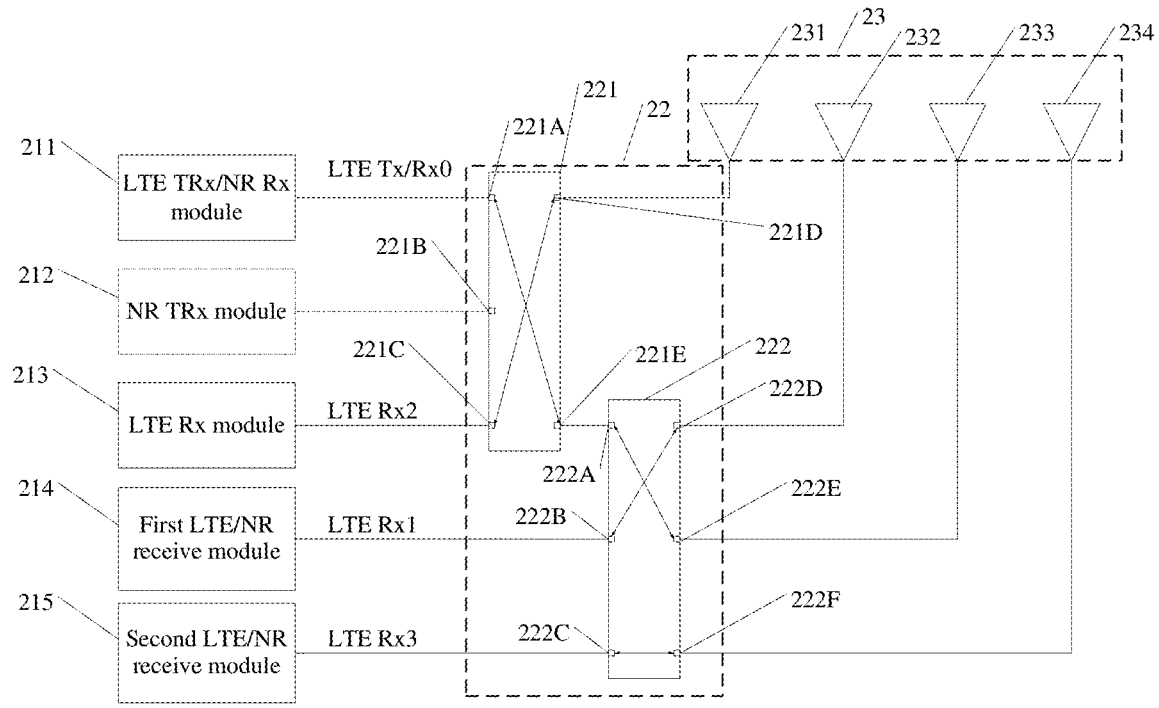
FIG. 5 is a fourth schematic diagram of an antenna configuration according to an embodiment of the present disclosure.

FIG. 5 shows a configuration when the radio frequency structure works only in the LTE mode, to implement DL 4*4 MIMO. In FIG. 5, the first switch module and the second switch module are adjusted, so that the LTE TRx/NR receive module 211 is connected to the third antenna 233, and is configured to send a signal of the LTE or receive a first receive signal Rx0 of the LTE;

the LTE receive module 213 is connected to the first antenna 231, and is configured to receive a third receive signal Rx2 of the LTE;

the first LTE/NR receive module 214 is connected to the second antenna 232, and is configured to receive a second receive signal Rx1 of the LTE; and the second LTE/NR receive module 215 is connected to the fourth antenna 234, and is configured to receive a fourth receive signal Rx3 of the LTE.

Compared with the configuration in FIG. 3, in this configuration, a configuration of the second antenna 232 (ANT1) and a configuration of the third antenna 233 (ANT2) are exchanged.

Figure 6:
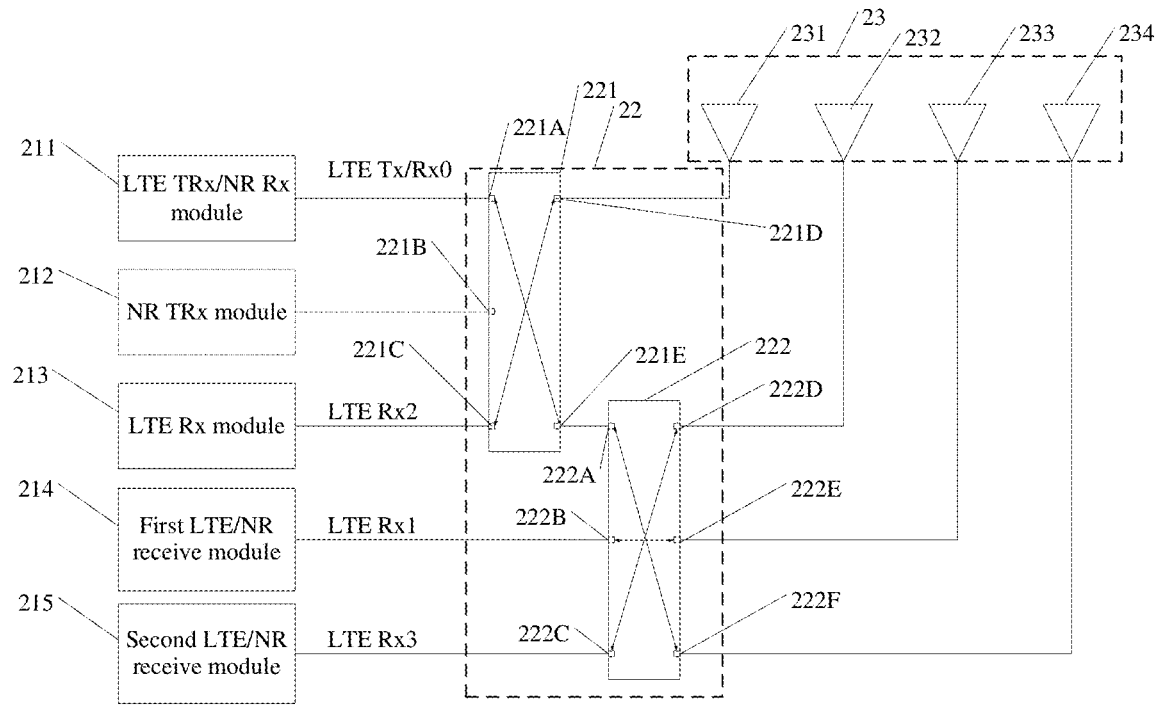
FIG. 6 is a fifth schematic diagram of an antenna configuration according to an embodiment of the present disclosure.

FIG. 6 shows a configuration when the radio frequency structure works only in the LTE mode, to implement DL 4*4 MIMO. In FIG. 6, the first switch module and the second switch module are adjusted, so that the LTE TRx/NR receive module 211 is connected to the fourth antenna 234, and is configured to send a signal of the LTE or receive a first receive signal Rx0 of the LTE;

the LTE receive module 213 is connected to the first antenna 231, and is configured to receive a third receive signal Rx2 of the LTE;

the first LTE/NR receive module 214 is connected to the third antenna 233, and is configured to receive a second receive signal Rx1 of the LTE; and the second LTE/NR receive module 215 is connected to the second antenna 232, and is configured to receive a fourth receive signal Rx3 of the LTE.

Compared with the configuration in FIG. 3, in this configuration, a configuration of the second antenna 232 (ANT1) and a configuration of the fourth antenna 233 (ANT3) are exchanged.

In a case of LTE-NR dual connectivity, due to a requirement of a base station, SRS round-transmit needs to be performed on four antennas on an NR band of a terminal device, and the NR band needs to support DL 4*4 MIMO. In addition, in this embodiment of the present disclosure, DL 2*2 MIMO on an LTE band can be supported in the case of dual connectivity. In this case, there are the following four configurations.

Figure 7:
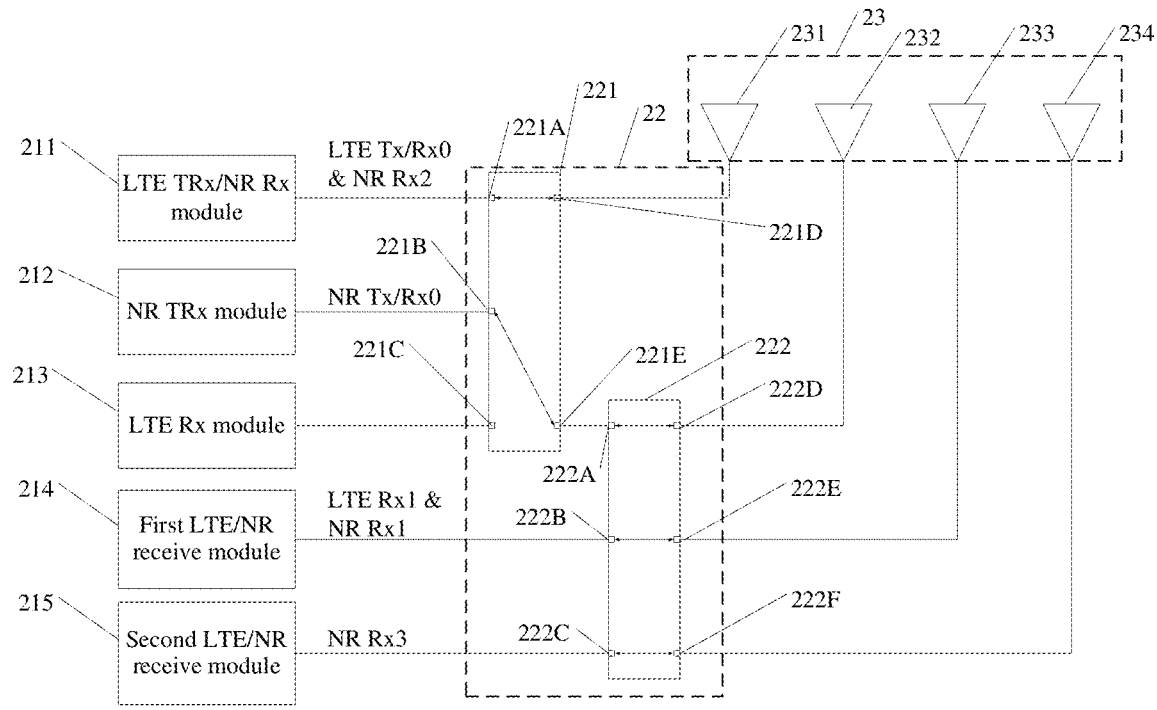
FIG. 7 is a sixth schematic diagram of an antenna configuration according to an embodiment of the present disclosure.

FIG. 7 shows an LTE/NR default configuration in the case of LTE-NR dual connectivity. The first switch module and the second switch module are adjusted, so that the LTE TRx/NR receive module 211 is connected to the first antenna 231, and is configured to send a signal of the LTE or receive a first receive signal Rx0 of the LTE, and/or configured to receive a third receive signal Rx2 of the NR;

the NR TRx module 212 is connected to the second antenna 232, and is configured to send a signal of the NR or receive a first receive signal Rx0 of the NR;

the first LTE/NR receive module 214 is connected to the third antenna 233, and is configured to receive a second receive signal Rx1 of the LTE and/or configured to receive a second receive signal Rx1 of the NR; and the second LTE/NR receive module 215 is connected to the fourth antenna 234, and is configured to receive a fourth receive signal Rx3 of the NR.

In this configuration, LTE DL 2*2 MIMO and the NR DL 4*4 MIMO in the case of the LTE/NR dual connectivity are implemented.

Figure 8:
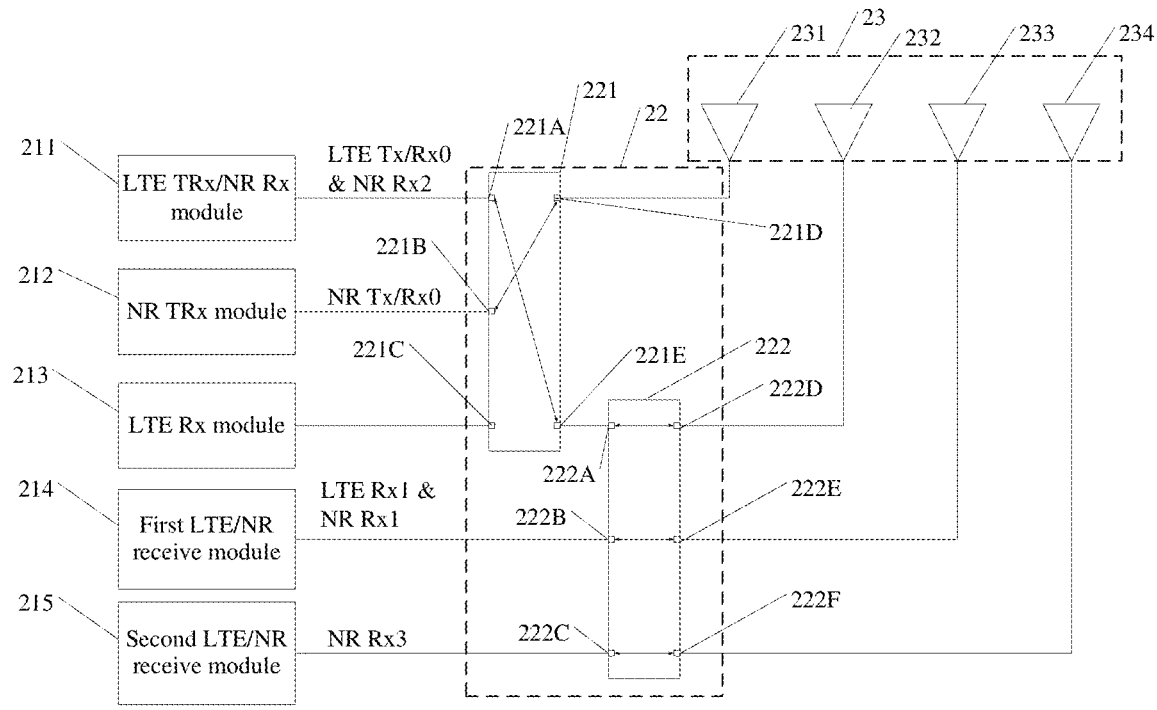
FIG. 8 is a seventh schematic diagram of an antenna configuration according to an embodiment of the present disclosure.

FIG. 8 shows an LTE/NR default configuration in the case of LTE-NR dual connectivity. The first switch module and the second switch module are adjusted, so that the LTE TRx/NR receive module 211 is connected to the second antenna 232, and is configured to send a signal of the LTE or receive a first receive signal Rx0 of the LTE, and/or configured to receive a third receive signal Rx2 of the NR;

the NR TRx module 212 is connected to the first antenna 231, and is configured to send a signal of the NR or receive a first receive signal Rx0 of the NR;

the first LTE/NR receive module 214 is connected to the third antenna 233, and is configured to receive a second receive signal Rx1 of the LTE and/or configured to receive a second receive signal Rx1 of the NR; and the second LTE/NR receive module 215 is connected to the fourth antenna 234, and is configured to receive a fourth receive signal Rx3 of the NR.

Compared with the configuration in FIG. 7, on the NR band, a configuration of the second antenna (ANT1) and a configuration of the first antenna (ANT0) are exchanged. In addition, in this case, dual-antenna switching can be implemented on the LTE band. In other words, for LTE Tx, switching can be performed between the second antenna (ANT1) and the third antenna ANT2.

Figure 9:
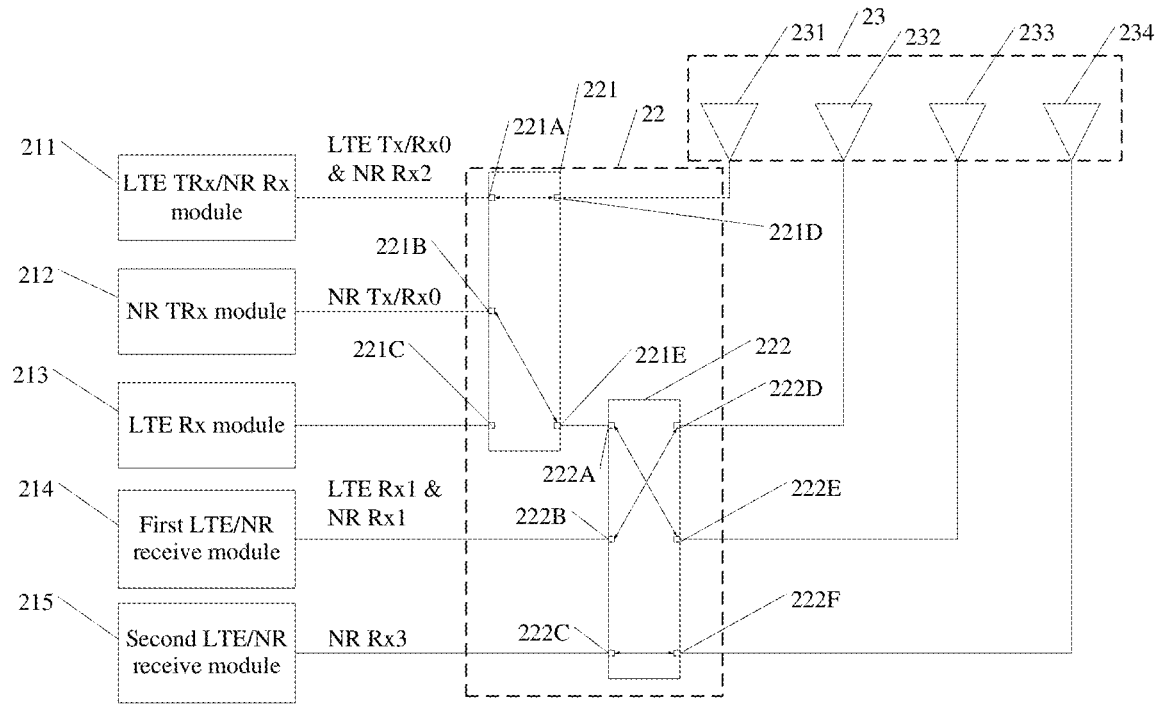
FIG. 9 is an eighth schematic diagram of an antenna configuration according to an embodiment of the present disclosure.

FIG. 9 shows an LTE/NR default configuration in the case of LTE-NR dual connectivity. The first switch module and the second switch module are adjusted, so that the LTE TRx/NR receive module 211 is connected to the first antenna 231, and is configured to send a signal of the LTE or receive a first receive signal Rx0 of the LTE, and/or configured to receive a third receive signal Rx2 of the NR;

the NR TRx module 212 is connected to the third antenna 233, and is configured to send a signal of the NR or receive a first receive signal Rx0 of the NR;

the first LTE/NR receive module 214 is connected to the second antenna 232, and is configured to receive a second receive signal Rx1 of the LTE and/or configured to receive a second receive signal Rx1 of the NR; and the second LTE/NR receive module 215 is connected to the fourth antenna 234, and is configured to receive a fourth receive signal Rx3 of the NR.

Compared with the configuration in FIG. 7, on the NR band, a configuration of the second antenna (ANT1) and a configuration of the third antenna (ANT2) are exchanged.

Figure 10:
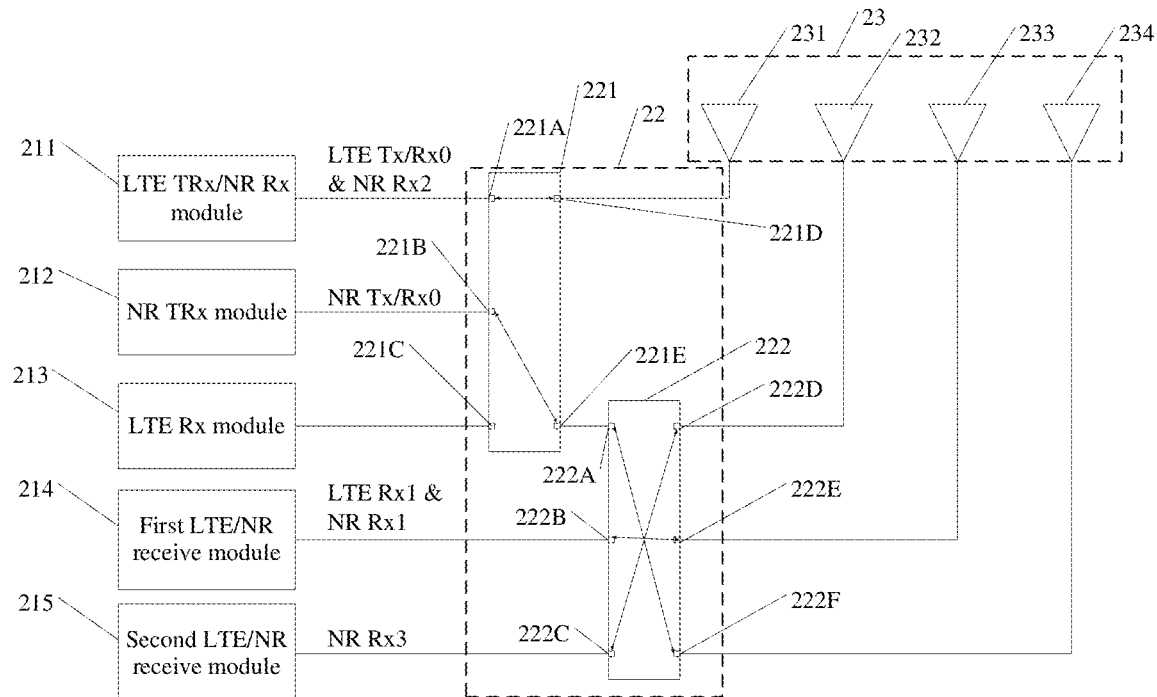
FIG. 10 is a second schematic diagram of a radio frequency structure according to an embodiment of the present disclosure.

FIG. 10 shows an LTE/NR default configuration in the case of LTE-NR dual connectivity. The first switch module and the second switch module are adjusted, so that the LTE TRx/NR receive module 211 is connected to the first antenna 231, and is configured to send a signal of the LTE or receive a first receive signal Rx0 of the LTE, and/or configured to receive a third receive signal Rx2 of the NR;

the NR TRx module 212 is connected to the fourth antenna 234, and is configured to send a signal of the NR or receive a first receive signal Rx0 of the NR;

the first LTE/NR receive module 214 is connected to the third antenna 233, and is configured to receive a second receive signal Rx1 of the LTE and/or configured to receive a second receive signal Rx1 of the NR; and the second LTE/NR receive module 215 is connected to the second antenna 232, and is configured to receive a fourth receive signal Rx3 of the NR.

Compared with the configuration in FIG. 7, on the NR band, a configuration of the second antenna (ANT1) and a configuration of the fourth antenna (ANT3) are exchanged.

In the foregoing embodiment, the first switch module is a DP3T switch and the second switch module is a 3P3T switch.

It can be learned from the foregoing embodiment that in this embodiment of the present disclosure, 4-antenna switching and DL 4*4 MIMO when the radio frequency structure works only in the LTE can be implemented, an EN-DC hardware design solution in the LTE and the NR in the NSA mode can be implemented, and the 1T4R SRS antenna round-transmit technology on the NR band in the case of EN-DC can be supported. In addition, in this embodiment, only four antennas are needed, so that the complexity of antenna design is effectively reduced.

Figure 11:
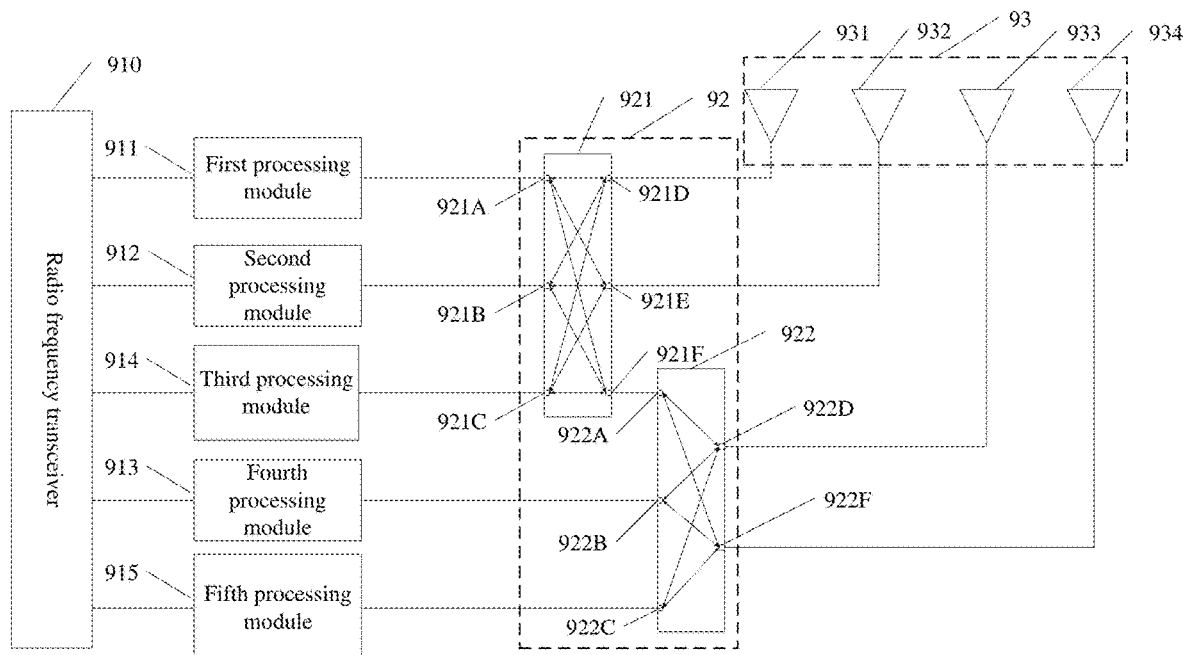
FIG. 11 is a ninth schematic diagram of an antenna configuration according to an embodiment of the present disclosure.

FIG. 11 is a schematic diagram of a radio frequency structure according to an embodiment of the present disclosure. As shown in FIG. 11, the radio frequency structure may include a radio frequency front-end module, a switch module 92, and an antenna module 93.

The radio frequency front-end module includes a radio frequency transceiver 910, a first processing module 911, a second processing module 912, a third processing module 914, a fourth processing module 913, and a fifth processing module 915.

The switch module 92 includes a first switch module 921 and a second switch module 922.

The antenna module 93 includes a first antenna 931, a second antenna 932, a third antenna 933, and a fourth antenna 934 that are used to receive or send radio frequency signals.

A second end of the first processing module 911 is connected to a first end 921A of the first switch module 921, a second end of the second processing module 912 is connected to a second end 921B of the first switch module 921, and a second end of the third processing module 914 is connected to a third end 921C of the first switch module 921.

A second end of the fourth processing module 913 is connected to a second end 922B of the second switch module 922, and a second end of the fifth processing module 915 is connected to a third end 922C of the second switch module 922.

A fourth end 921D of the first switch module 921 is connected to the first antenna 931, a fifth end 921E of the first switch module 921 is connected to the second antenna 932, a fourth end 921D of the second switch module 921 is connected to the third antenna 933, and a fifth end 922E of the second switch module 922 is connected to the fourth antenna 934.

A sixth end 921F of the first switch module 921 is connected to a first end 922A of the second switch module 922.

The first processing module 911 is configured to send or receive a signal of a first network, and/or configured to receive a signal of a second network.

The second processing module 912 is configured to receive or send a signal of the second network.

The third processing module 914 is configured to receive a signal of the first network and/or a signal of the second network.

The fourth processing module 913 is configured to receive a signal of the first network and/or a signal of the second network.

The fifth processing module 915 is configured to receive a signal of the first network and/or a signal of the second network.

In this embodiment of the present disclosure, using an antenna module including four antennas can meet a technical requirement in an NSA mode. Therefore, compared with the related technologies, a quantity of antennas is reduced by using this embodiment of the present disclosure, thereby reducing the complexity of antenna design.

The following describes in detail the radio frequency structure in this embodiment of the present disclosure by using an example in which the first network is LTE and the second network is NR.

Optionally, the first processing module corresponds to an LTE TRx (transceive)/NR Rx module, the second processing module corresponds to an NR TRx module, the third processing module corresponds to a second LTE/NR receive (Rx) module, the fourth processing module corresponds to a first LTE/NR receive module, and the fifth processing module corresponds to a third LTE/NR receive module.

Figure 12:
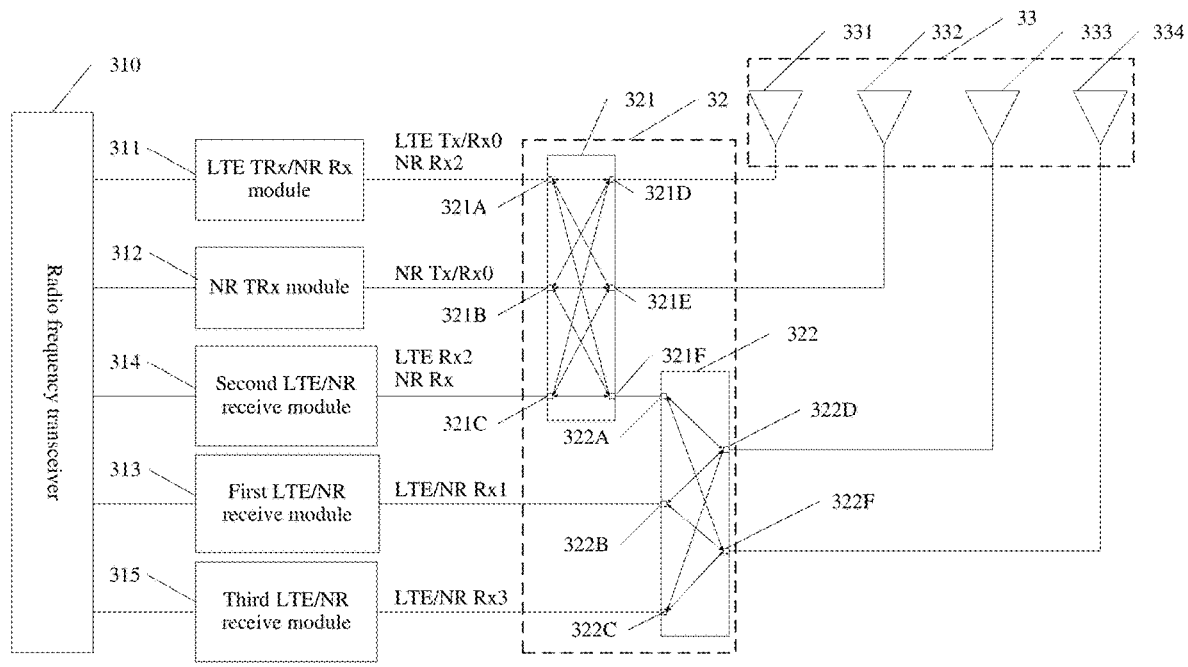
FIG. 12 is a tenth schematic diagram of an antenna configuration according to an embodiment of the present disclosure.

FIG. 12 is a schematic diagram of a radio frequency structure according to an embodiment of the present disclosure. As shown in FIG. 12, the radio frequency structure includes a radio frequency front-end module, a switch module 32, and an antenna module 33.

The radio frequency front-end module includes a radio frequency transceiver 310, an LTE TRx/NR Rx module 311, an NR TRx module 312, a first LTE/NR receive module (LTE/NR Rx Module #1) 313, a second LTE/NR receive module (LTE/NR Rx Module #2) 314, and a third LTE/NR receive module (LTE/NR Rx Module #3) 315.

The switch module 32 includes a first switch module 321 and a second switch module 322.

The antenna module 33 includes a first antenna 331, a second antenna 332, a third antenna 333, and a fourth antenna 334 that are used to receive or send radio frequency signals.

As shown in FIG. 12, a second end of the LTE TRx/NR receive module 311, a second end of the NR TRx module 312, and a second end of the second LTE/NR receive module 314 are respectively connected to a first input end 321A, a second input end 321B, and a third input end 321C of the first switch module 321.

A sixth end 321F of the first switch module 321, a second end of the first LTE/NR receive module 313, and a second end of the third LTE/NR receive module 315 are respectively connected to a first input end 322A, a second input end 322B, and a third input end 322C of the second switch module 322.

A fourth end 321D and a fifth end 321E of the first switch module 321 are respectively connected to the first antenna 331 and the second antenna 332, and a fourth end 322D and a fifth end 322F of the second switch module 322 are respectively connected to the third antenna 333 and the fourth antenna 334.

The LTE TRx/NR receive module 311 is configured to receive or send a signal of the LTE and/or configured to receive a signal of the NR.

The NR TRx module 312 is configured to receive or send a signal of the NR.

The first LTE/NR receive module 313 is configured to receive a signal of the LTE and/or the NR.

The second LTE/NR receive module 314 is configured to receive a signal of the LTE and/or the NR.

The third LTE/NR receive module 315 is configured to receive a signal of the LTE and/or the NR.

In this embodiment, dual-antenna switching and DL 4*4 MIMO in the LTE can be implemented, and a 1T4R SRS antenna round-transmit technology on an NR band in the LTE and the NR in a case of EN-DC is supported.

In this embodiment of the present disclosure, using an antenna module including four antennas can meet a technical requirement in an NSA mode. Therefore, compared with the related technologies, a quantity of antennas is reduced by using this embodiment of the present disclosure, thereby reducing the complexity of antenna design.

When the radio frequency structure works only in the LTE, there may be the following four configurations, to implement dual-antenna switching in the LTE, and implement LTE DL 4*4 MIMO. The configurations are described in detail below with reference to different accompanying drawings.

Figure 13:
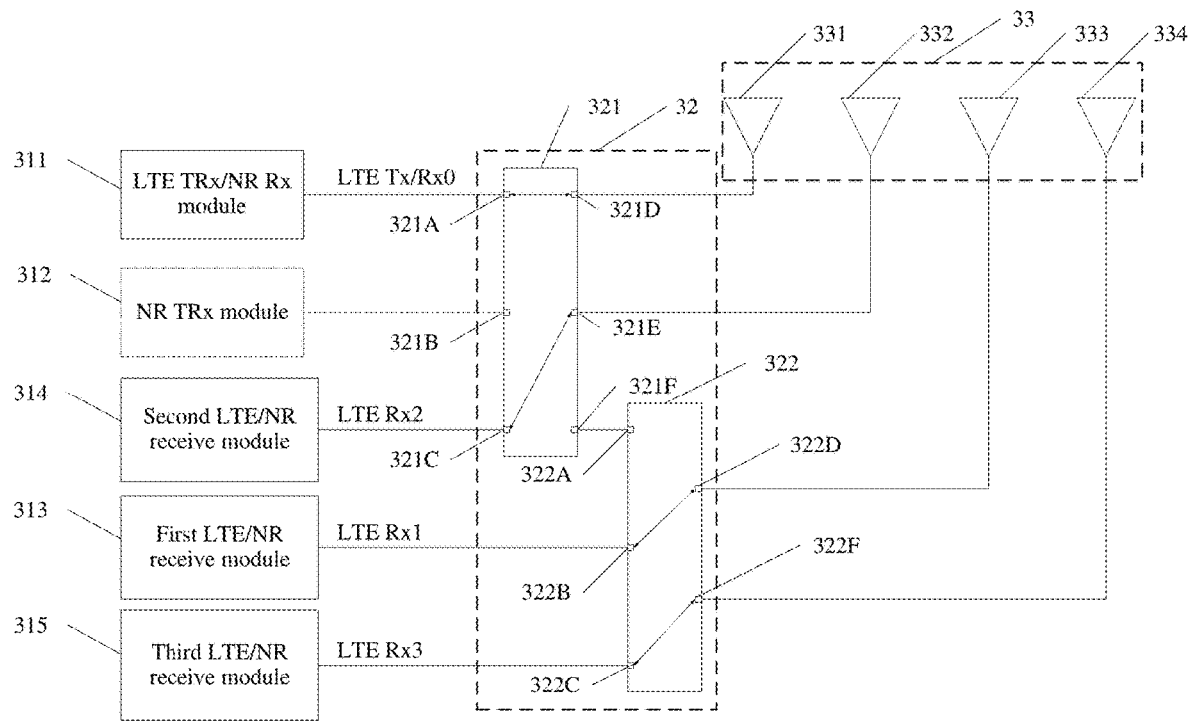
FIG. 13 is an eleventh schematic diagram of an antenna configuration according to an embodiment of the present disclosure.

FIG. 13 shows a configuration when the radio frequency structure works only in the LTE mode, to implement DL 4*4 MIMO. In FIG. 13, the first switch module and the second switch module are adjusted, so that the LTE TRx/NR receive module 311 is connected to the first antenna 331, and is configured to send a signal of the LTE or receive a signal of a first port Rx0 of the LTE;

the second LTE/NR receive module 314 is connected to the second antenna 332, and is configured to receive a signal of a third port Rx2 of the LTE;

the first LTE/NR receive module 313 is connected to the third antenna 333, and is configured to receive a signal of a second port of the LTE; and the third LTE/NR receive module 315 is connected to the fourth antenna 334, and is configured to receive a signal of a fourth port Rx3 of the LTE.

Figure 14:
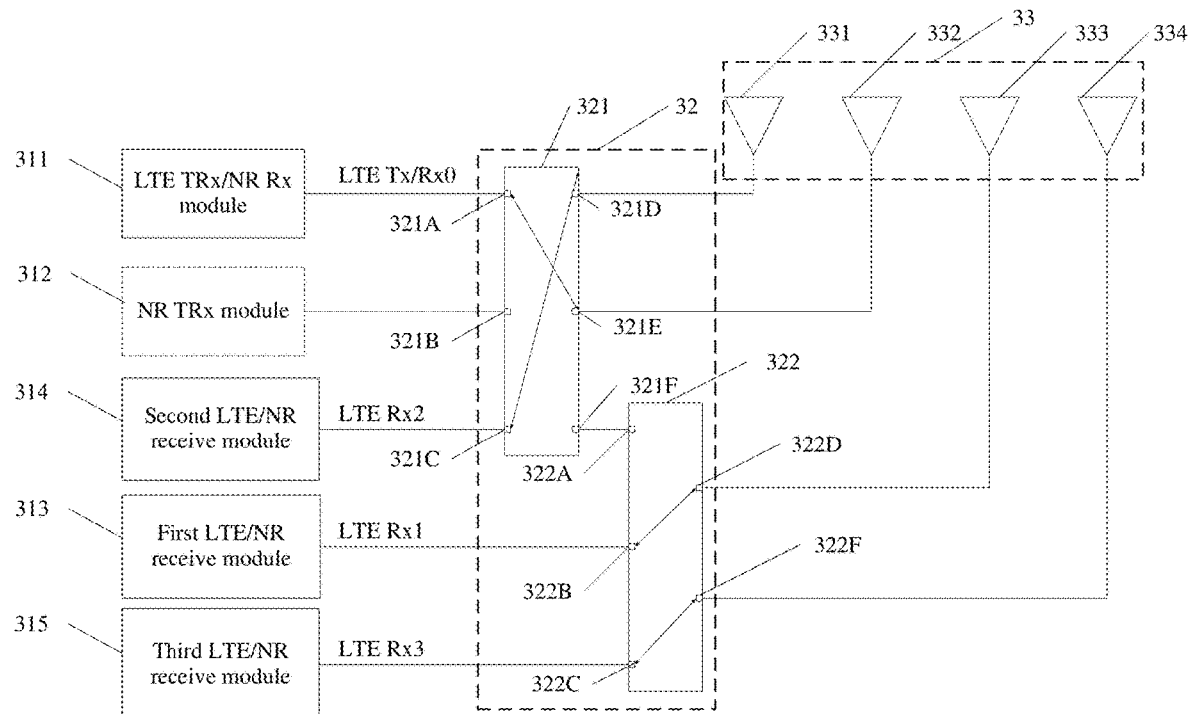
FIG. 14 is a twelfth schematic diagram of an antenna configuration according to an embodiment of the present disclosure.

FIG. 14 shows a configuration when the radio frequency structure works only in the LTE mode, to implement DL 4*4 MIMO. In FIG. 14, the first switch module and the second switch module are adjusted, so that the LTE TRx/NR receive module 311 is connected to the second antenna 332, and is configured to send a signal of the LTE or receive a signal of a first port Rx0 of the LTE;

the second LTE/NR receive module 314 is connected to the first antenna 331, and is configured to receive a signal of a third port Rx2 of the LTE;

the first LTE/NR receive module 313 is connected to the third antenna 333, and is configured to receive a signal of a second port Rx1 of the LTE; and the third LTE/NR receive module 315 is connected to the fourth antenna 334, and is configured to receive a signal of a fourth port Rx3 of the LTE.

In a case of LTE-NR dual connectivity, due to a requirement of a base station, SRS round-transmit needs to be performed on four antennas on an NR band of a terminal device, and the NR band needs to support DL 4*4 MIMO. In addition, in this embodiment of the present disclosure, DL 2*2 MIMO on an LTE band can be supported in the case of dual connectivity. In this case, there are the following four configurations.

Figure 15:
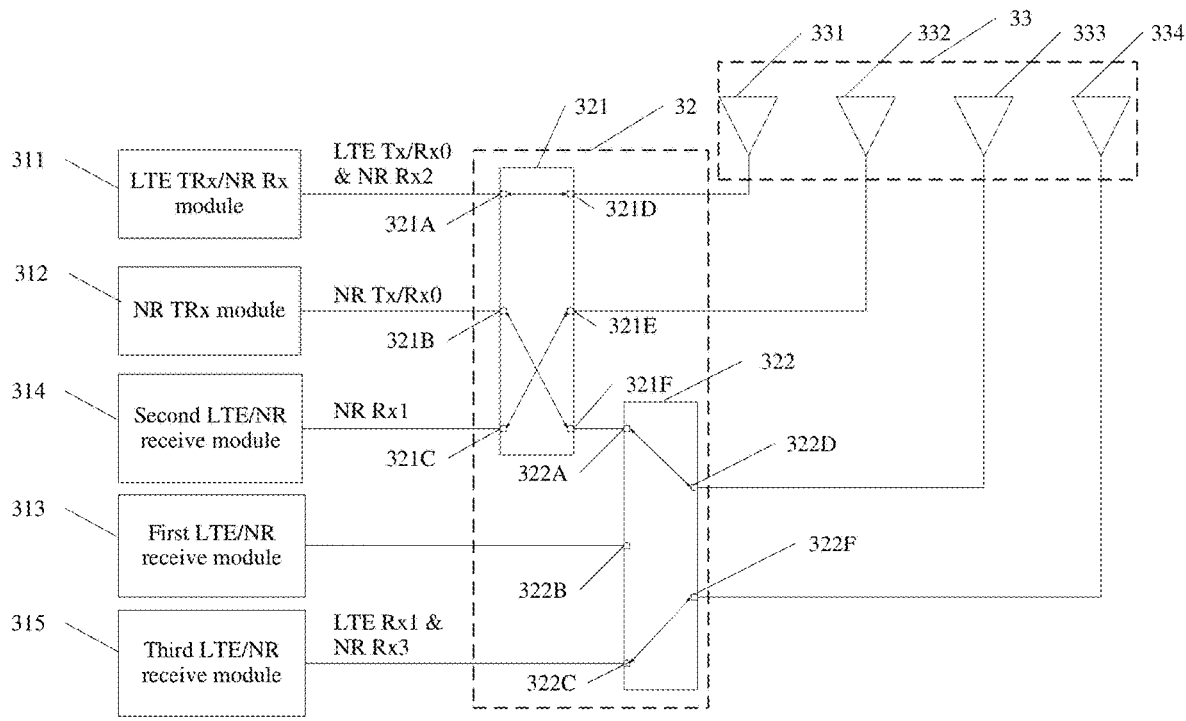
FIG. 15 is a thirteenth schematic diagram of an antenna configuration according to an embodiment of the present disclosure.

FIG. 15 shows an LTE/NR default configuration in the case of LTE-NR dual connectivity. The first switch module and the second switch module are adjusted, so that the LTE TRx/NR receive module 311 is connected to the first antenna 331, and is configured to send a signal of the LTE or receive a signal of a first port Rx0 of the LTE, and/or configured to receive a signal of a third port Rx2 of the NR;

the NR TRx module 312 is connected to the third antenna 333, and is configured to send a signal of the NR or receive a signal of a first port Rx0 of the NR;

the second LTE/NR receive module 314 is connected to the second antenna 332, and is configured to receive a signal of a second port Rx1 of the NR;

the third LTE/NR receive module 315 is connected to the fourth antenna 334, and is configured to receive a signal of a second port Rx1 of the LTE and/or configured to receive a signal of a fourth port Rx3 of the NR.

In this configuration, LTE DL 2*2 MIMO and NR DL 4*4 MIMO in the case of the LTE/NR dual connectivity can be implemented.

Figure 16:
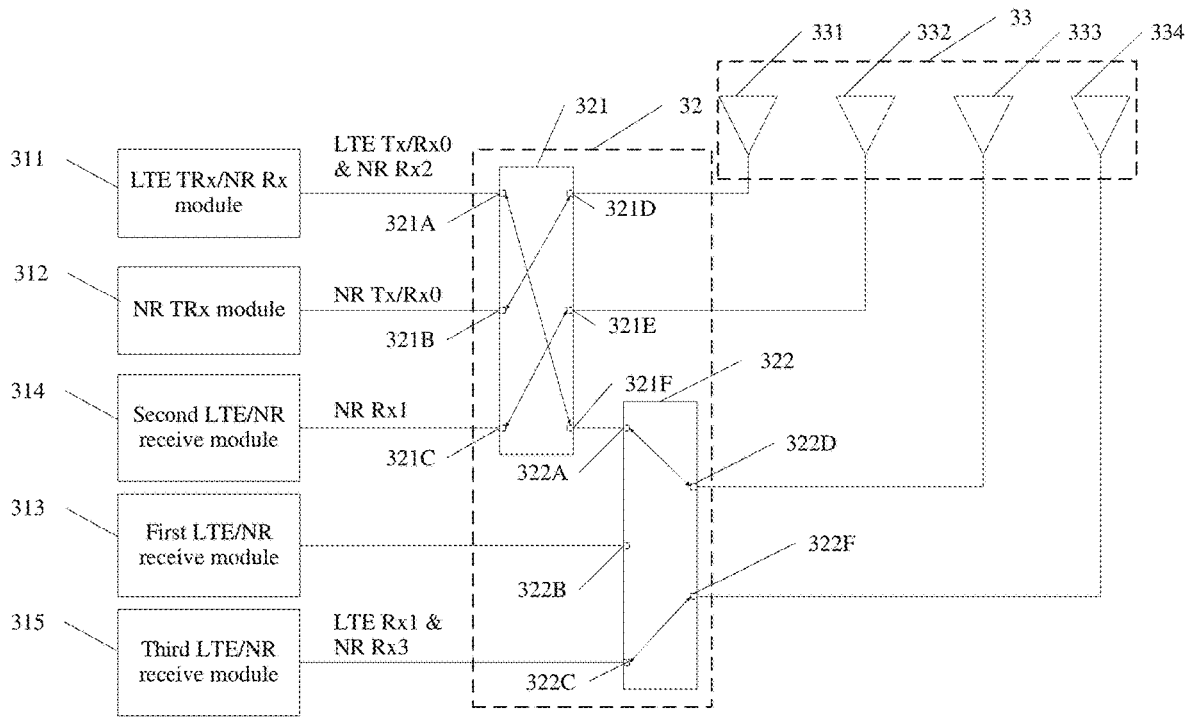
FIG. 16 is a fourteenth schematic diagram of an antenna configuration according to an embodiment of the present disclosure.

FIG. 16 shows an LTE/NR configuration in the case of the LTE/NR dual connectivity. The first switch module and the second switch module are adjusted, so that the LTE TRx/NR receive module 311 is connected to the third antenna 333, and is configured to send a signal of the LTE or receive a signal of a first port Rx0 of the LTE, and/or configured to receive a signal of a third port Rx2 of the NR;

the NR TRx module 312 is connected to the first antenna 331, and is configured to send a signal of the NR or receive a signal of a first port Rx0 of the NR;

the second LTE/NR receive module 314 is connected to the second antenna 332, and is configured to receive a signal of a second port Rx1 of the NR; and the third LTE/NR receive module 315 is connected to the fourth antenna 334, and is configured to receive a signal of a second port Rx1 of the LTE and/or configured to receive a signal of a fourth port Rx3 of the NR.

Compared with FIG. 15, in this configuration, a configuration of the third antenna (ANT2) and a configuration of the first antenna (ANT0) on the NR band are exchanged. In addition, in this case, dual-antenna switching can be implemented on an LTE band. In other words, for LTE Tx, switching can be performed between the third antenna (ANT2) and the fourth antenna (ANT3).

Figure 17:
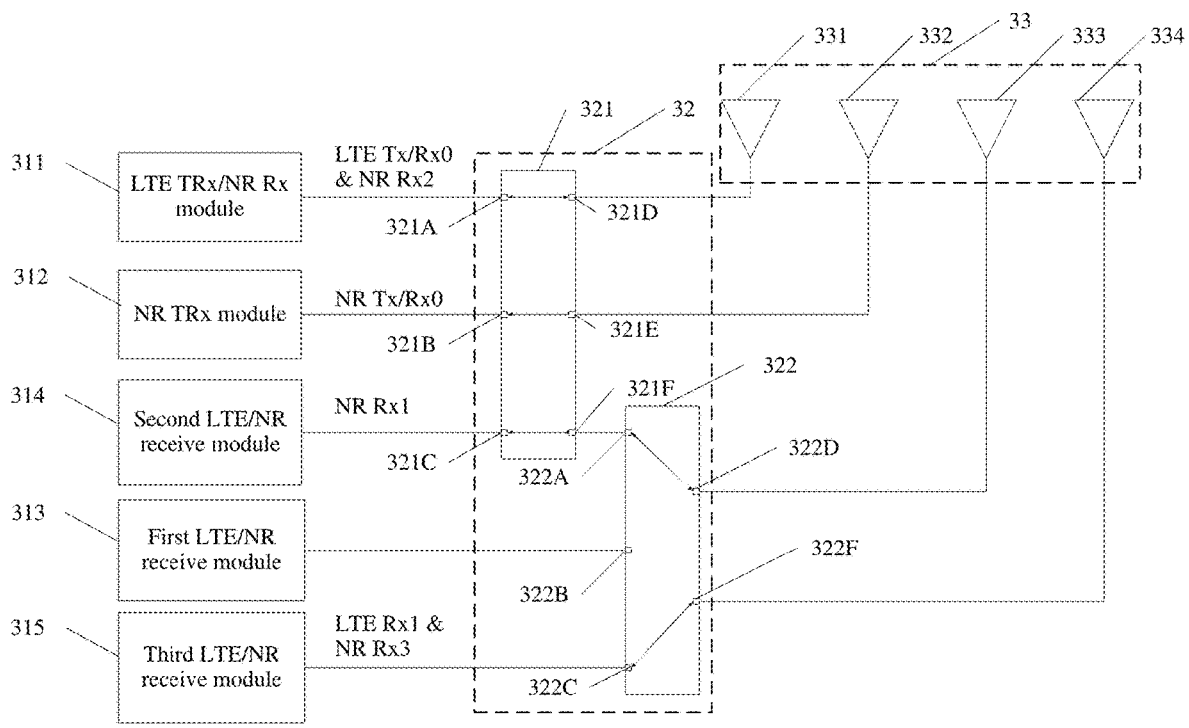
FIG. 17 is a fifteenth schematic diagram of an antenna configuration according to an embodiment of the present disclosure.

FIG. 17 shows an LTE/NR configuration in the case of LTE-NR dual connectivity. The first switch module and the second switch module are adjusted, so that the LTE TRx/NR receive module 311 is connected to the first antenna 331, and is configured to send a signal of the LTE or receive a signal of a first port Rx0 of the LTE, and/or configured to receive a signal of a third port Rx2 of the NR;

the NR TRx module 312 is connected to the second antenna 332, and is configured to send a signal of the NR or receive a signal of a first port Rx0 of the NR;

the second LTE/NR receive module 314 is connected to the third antenna 333, and is configured to receive a signal of a second port Rx1 of the NR; and the third LTE/NR receive module 315 is connected to the fourth antenna 334, and is configured to receive a signal of a second port Rx1 of the LTE and/or configured to receive a signal of a fourth port Rx3 of the NR.

Compared with FIG. 15, in this configuration, a configuration of the third antenna (ANT2) and a configuration of the second antenna (ANT1) on the NR band are exchanged.

Figure 18:
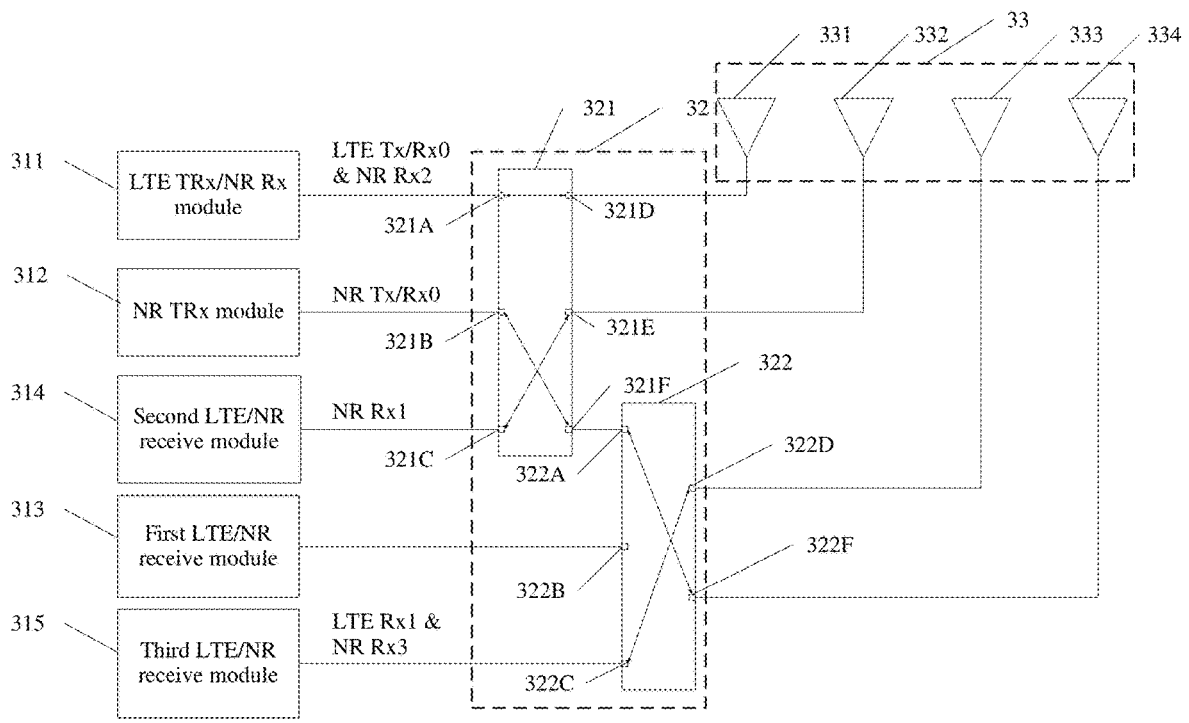
FIG. 18 is a sixteenth schematic diagram of an antenna configuration according to an embodiment of the present disclosure.

FIG. 18 shows an LTE/NR configuration in the case of LTE-NR dual connectivity. The first switch module and the second switch module are adjusted, so that the LTE TRx/NR receive module 311 is connected to the first antenna 331, and is configured to send a signal of the LTE or receive a signal of a first port Rx0 of the LTE, and/or configured to receive a signal of a third port Rx2 of the NR;

the NR TRx module 312 is connected to the fourth antenna 334, and is configured to send a signal of the NR or receive a signal of a first port Rx0 of the NR;

the second LTE/NR receive module 314 is connected to the second antenna 332, and is configured to receive a signal of a second port Rx1 of the NR; and the third LTE/NR receive module 315 is connected to the third antenna 333, and is configured to receive a signal of a second port Rx1 of the LTE and/or configured to receive a signal of a fourth port Rx3 of the NR.

Compared with FIG. 15, in this configuration, a configuration of the third antenna (ANT2) and a configuration of the fourth antenna (ANT3) on an NR band are exchanged.

It can be learned from the foregoing description that dual-antenna switching and DL 4*4 MIMO when the radio frequency structure works only in the LTE can be implemented, an EN-DC hardware design solution in the LTE and the NR in the NSA mode can be implemented, and the 1T4R SRS antenna round-transmit technology on the NR band in the case of EN-DC can be supported. In addition, in this embodiment, only four antennas are needed, so that the complexity of antenna design is effectively reduced.

In addition, in this embodiment of the present disclosure, a configuration of the radio frequency front-end module, a configuration of the switch module, and a configuration of a quantity of antennas may be simplified, to implement 2*2 MIMO in the LTE and the NR.

In the embodiments of the present disclosure, the radio frequency structure may be applied to a terminal device, for example, a mobile phone, a tablet computer, a laptop computer, a personal digital assistant (PDA), a mobile Internet device (MID), or a wearable device.

It should be noted that, in this specification, the terms "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such a process, method, article, or apparatus. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially, or the part contributing to the related technologies may be implemented in a form of a software product. The computer software product is stored in a storage medium (for example, a ROM/RAM, a magnetic disk, or a compact disc), and includes a plurality of instructions for instructing a terminal device (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the foregoing implementations. The foregoing implementations are only illustrative rather than restrictive. Inspired by the present disclosure, a person of ordinary skill in the art can still derive many variations without departing from the essence of the present disclosure and the protection scope of the claims. All these variations shall fall within the protection of the present disclosure.

What is claimed is:

1. A radio frequency structure, comprising a radio frequency front-end module, a switch module, and an antenna module, wherein the radio frequency front-end module comprises a radio frequency transceiver, and a first processing module, a second processing module, a third processing module, a fourth processing module, and a fifth processing module that are connected to the radio frequency transceiver;

the switch module comprises a first switch module and a second switch module;

the antenna module comprises a first antenna, a second antenna, a third antenna, and a fourth antenna that are used to receive or send radio frequency signals;

a second end of the first processing module is connected to a first end of the first switch module, a second end of the second processing module is connected to a second end of the first switch module, and a second end of the third processing module is connected to a third end of the first switch module;

a second end of the fourth processing module is connected to a second end of the second switch module, and a second end of the fifth processing module is connected to a third end of the second switch module;

a fourth end of the first switch module is connected to the first antenna, a fourth end of the second switch module is connected to the second antenna, a fifth end of the second switch module is connected to the third antenna, and a sixth end of the second switch module is connected to the fourth antenna;

a fifth end of the first switch module is connected to a first end of the second switch module;

the first processing module is configured to receive or send a signal of a first network, and/or configured to receive a signal of a second network;

the second processing module is configured to receive or send a signal of the second network;

the third processing module is configured to receive a signal of the first network;

the fourth processing module is configured to receive a signal of the first network and/or a signal of the second network; and the fifth processing module is configured to receive a signal of the first network and/or a signal of the second network;

wherein the first network is long term evolution (LTE), and the second network is new radio (NR).

2. The radio frequency structure according to claim 1, wherein when the radio frequency structure works only in the LTE, the first switch module and the second switch module are adjusted, so that the first processing module is connected to the second antenna, and is configured to send a signal of the LTE or receive a first receive signal Rx0 of the LTE;

the third processing module is connected to the first antenna, and is configured to receive a third receive signal Rx2 of the LTE;

the fourth processing module is connected to the third antenna, and is configured to receive a second receive signal Rx1 of the LTE; and the fifth processing module is connected to the fourth antenna, and is configured to receive a fourth receive signal Rx3 of the LTE.

3. The radio frequency structure according to claim 1, wherein when the radio frequency structure works only in the LTE, the first switch module and the second switch module are adjusted, so that the first processing module is connected to the first antenna, and is configured to send a signal of the LTE or receive a first receive signal Rx0 of the LTE;

the third processing module is connected to the second antenna, and is configured to receive a third receive signal Rx2 of the LTE;

the fourth processing module is connected to the third antenna, and is configured to receive a second receive signal Rx1 of the LTE; and the fifth processing module is connected to the fourth antenna, and is configured to receive a fourth receive signal Rx3 of the LTE.

4. The radio frequency structure according to claim 1, wherein when the radio frequency structure works only in the LTE, the first switch module and the second switch module are adjusted, so that the first processing module is connected to the third antenna, and is configured to send a signal of the LTE or receive a first receive signal Rx0 of the LTE;

the third processing module is connected to the first antenna, and is configured to receive a third receive signal Rx2 of the LTE;

the fourth processing module is connected to the second antenna, and is configured to receive a second receive signal Rx1 of the LTE; and the fifth processing module is connected to the fourth antenna, and is configured to receive a fourth receive signal Rx3 of the LTE.

5. The radio frequency structure according to claim 1, wherein when the radio frequency structure works only in the LTE, the first switch module and the second switch module are adjusted, so that the first processing module is connected to the fourth antenna, and is configured to send a signal of the LTE or receive a first receive signal Rx0 of the LTE;

the third processing module is connected to the first antenna, and is configured to receive a third receive signal Rx2 of the LTE;

the fourth processing module is connected to the third antenna, and is configured to receive a second receive signal Rx of the LTE; and the fifth processing module is connected to the second antenna, and is configured to receive a fourth receive signal Rx3 of the LTE.

6. The radio frequency structure according to claim 1, wherein in a case of LTE-NR dual connectivity, the first switch module and the second switch module are adjusted, so that the first processing module is connected to the first antenna, and is configured to send a signal of the LTE or receive a first receive signal Rx0 of the LTE, and/or configured to receive a third receive signal Rx2 of the NR;

the second processing module is connected to the second antenna, and is configured to send a signal of the NR or receive a first receive signal Rx0 of the NR;

the fourth processing module is connected to the third antenna, and is configured to receive a second receive signal Rx1 of the LTE and/or configured to receive a second receive signal Rx1 of the NR; and the fifth processing module is connected to the fourth antenna, and is configured to receive a fourth receive signal Rx3 of the NR.

7. The radio frequency structure according to claim 1, wherein in a case of LTE-NR dual connectivity, the first switch module and the second switch module are adjusted, so that the first processing module is connected to the second antenna, and is configured to send a signal of the LTE or receive a first receive signal Rx0 of the LTE, and/or configured to receive a third receive signal Rx2 of the NR;

the second processing module is connected to the first antenna, and is configured to send a signal of the NR or receive a first receive signal Rx0 of the NR;

the fourth processing module is connected to the third antenna, and is configured to receive a second receive signal Rx1 of the LTE and/or configured to receive a second receive signal Rx1 of the NR; and the fifth processing module is connected to the fourth antenna, and is configured to receive a fourth receive signal Rx3 of the NR.

8. The radio frequency structure according to claim 1, wherein in a case of LTE-NR dual connectivity, the first switch module and the second switch module are adjusted, so that the first processing module is connected to the first antenna, and is configured to send a signal of the LTE or receive a first receive signal Rx0 of the LTE, and/or configured to receive a third receive signal Rx2 of the NR;

the second processing module is connected to the third antenna, and is configured to send a signal of the NR or receive a first receive signal Rx0 of the NR;

the fourth processing module is connected to the second antenna, and is configured to receive a second receive signal Rx1 of the LTE and/or configured to receive a second receive signal Rx1 of the NR; and the fifth processing module is connected to the fourth antenna, and is configured to receive a fourth receive signal Rx3 of the NR.

9. The radio frequency structure according to claim 1, wherein in a case of LTE-NR dual connectivity, the first switch module and the second switch module are adjusted, so that the first processing module is connected to the first antenna, and is configured to send a signal of the LTE or receive a first receive signal Rx0 of the LTE, and/or configured to receive a third receive signal Rx2 of the NR;

the second processing module is connected to the fourth antenna, and is configured to send a signal of the NR or receive a first receive signal Rx0 of the NR;

the fourth processing module is connected to the third antenna, and is configured to receive a second receive signal Rx1 of the LTE and/or configured to receive a second receive signal Rx1 of the NR; and the fifth processing module is connected to the second antenna, and is configured to receive a fourth receive signal Rx3 of the NR.

10. A radio frequency structure, comprising a radio frequency front-end module, a switch module, and an antenna module, wherein the radio frequency front-end module comprises a radio frequency transceiver, and a first processing module, a second processing module, a third processing module, a fourth processing module, and a fifth processing module that are connected to the radio frequency transceiver;

the switch module comprises a first switch module and a second switch module;

the antenna module comprises a first antenna, a second antenna, a third antenna, and a fourth antenna that are used to receive or send radio frequency signals;

a second end of the first processing module is connected to a first end of the first switch module, a second end of the second processing module is connected to a second end of the first switch module, and a second end of the third processing module is connected to a third end of the first switch module;

a second end of the fourth processing module is connected to a second end of the second switch module, and a second end of the fifth processing module is connected to a third end of the second switch module;

a fourth end of the first switch module is connected to the first antenna, a fifth end of the first switch module is connected to the second antenna, a fourth end of the second switch module is connected to the third antenna, and a fifth end of the second switch module is connected to the fourth antenna;

a sixth end of the first switch module is connected to a first end of the second switch module;

the first processing module is configured to send or receive a signal of a first network, and/or configured to receive a signal of a second network;

the second processing module is configured to receive or send a signal of the second network;

the third processing module is configured to receive a signal of the first network and/or a signal of the second network;

the fourth processing module is configured to receive a signal of the first network and/or a signal of the second network; and the fifth processing module is configured to receive a signal of the first network and/or a signal of the second network;

wherein the first network is long term evolution (LTE), and the second network is new radio (NR).

11. The radio frequency structure according to claim 10, wherein when the radio frequency structure works only in the LTE, the first switch module and the second switch module are adjusted, so that the first processing module is connected to the first antenna, and is configured to send a signal of the LTE or receive a signal of a first port Rx0 of the LTE;

the third processing module is connected to the second antenna, and is configured to receive a signal of a third port Rx2 of the LTE;

the fourth processing module is connected to the third antenna, and is configured to receive a signal of a second port Rx1 of the LTE; and the fifth processing module is connected to the fourth antenna, and is configured to receive a signal of a fourth port Rx3 of the LTE.

12. The radio frequency structure according to claim 10, wherein when the radio frequency structure works only in the LTE, the first switch module and the second switch module are adjusted, so that the first processing module is connected to the second antenna, and is configured to send a signal of the LTE or receive a signal of a first port Rx0 of the LTE;

the third processing module is connected to the first antenna, and is configured to receive a signal of a third port Rx2 of the LTE;

the fourth processing module is connected to the third antenna, and is configured to receive a signal of a second port Rx1 of the LTE; and the fifth processing module is connected to the fourth antenna, and is configured to receive a signal of a fourth port Rx3 of the LTE.

13. The radio frequency structure according to claim 10, wherein in a case of LTE-NR dual connectivity, the first switch module and the second switch module are adjusted, so that the first processing module is connected to the first antenna, and is configured to send a signal of the LTE or receive a signal of a first port Rx0 of the LTE, and/or configured to receive a signal of a third port Rx2 of the NR;

the second processing module is connected to the third antenna, and is configured to send a signal of the NR or receive a signal of a first port Rx0 of the NR;

the third processing module is connected to the second antenna, and is configured to receive a signal of a second port Rx1 of the NR; and the fifth processing module is connected to the fourth antenna, and is configured to receive a signal of a second port Rx1 of the LTE and/or configured to receive a signal of a fourth port Rx3 of the NR.

14. The radio frequency structure according to claim 10, wherein in a case of LTE-NR dual connectivity, the first switch module and the second switch module are adjusted, so that the first processing module is connected to the third antenna, and is configured to send a signal of the LTE or receive a signal of a first port Rx0 of the LTE, and configured to receive a signal of a third port Rx2 of the NR;

the second processing module is connected to the first antenna, and is configured to send a signal of the NR or receive a signal of a first port Rx0 of the NR;

the third processing module is connected to the second antenna, and is configured to receive a signal of a second port Rx1 of the NR; and the fifth processing module is connected to the fourth antenna, and is configured to receive a signal of a second port Rx1 of the LTE and/or configured to receive a signal of a fourth port Rx3 of the NR.

15. The radio frequency structure according to claim 10, wherein in a case of LTE-NR dual connectivity, the first switch module and the second switch module are adjusted, so that the first processing module is connected to the first antenna, and is configured to send a signal of the LTE or receive a signal of a first port Rx0 of the LTE, and/or configured to receive a signal of a third port Rx2 of the NR;

the second processing module is connected to the second antenna, and is configured to send a signal of the NR or receive a signal of a first port Rx0 of the NR;

the third processing module is connected to the third antenna, and is configured to receive a signal of a second port Rx1 of the NR; and the fifth processing module is connected to the fourth antenna, and is configured to receive a signal of a second port Rx1 of the LTE and/or configured to receive a signal of a fourth port Rx3 of the NR.

16. The radio frequency structure according to claim 10, wherein in a case of LTE-NR dual connectivity, the first switch module and the second switch module are adjusted, so that the first processing module is connected to the first antenna, and is configured to send a signal of the LTE or receive a signal of a first port Rx0 of the LTE, and/or configured to receive a signal of a third port Rx2 of the NR;

the second processing module is connected to the fourth antenna, and is configured to send a signal of the NR or receive a signal of a first port Rx0 of the NR;

the third processing module is connected to the second antenna, and is configured to receive a signal of a second port Rx1 of the NR; and the fifth processing module is connected to the third antenna, and is configured to receive a signal of a second port Rx1 of the LTE and/or configured to receive a signal of a fourth port Rx3 of the NR.

17. A terminal device, comprising a radio frequency structure, wherein the radio frequency structure comprises a radio frequency front-end module, a switch module, and an antenna module, wherein the radio frequency front-end module comprises a radio frequency transceiver, and a first processing module, a second processing module, a third processing module, a fourth processing module, and a fifth processing module that are connected to the radio frequency transceiver;

the switch module comprises a first switch module and a second switch module;

the antenna module comprises a first antenna, a second antenna, a third antenna, and a fourth antenna that are used to receive or send radio frequency signals;

a second end of the first processing module is connected to a first end of the first switch module, a second end of the second processing module is connected to a second end of the first switch module, and a second end of the third processing module is connected to a third end of the first switch module;

a second end of the fourth processing module is connected to a second end of the second switch module, and a second end of the fifth processing module is connected to a third end of the second switch module;

a fourth end of the first switch module is connected to the first antenna, a fourth end of the second switch module is connected to the second antenna, a fifth end of the second switch module is connected to the third antenna, and a sixth end of the second switch module is connected to the fourth antenna;

a fifth end of the first switch module is connected to a first end of the second switch module;

the first processing module is configured to receive or send a signal of a first network, and/or configured to receive a signal of a second network;

the second processing module is configured to receive or send a signal of the second network;

the third processing module is configured to receive a signal of the first network;

the fourth processing module is configured to receive a signal of the first network and/or a signal of the second network; and the fifth processing module is configured to receive a signal of the first network and/or a signal of the second network;

wherein the first network is long term evolution (LTE), and the second network is new radio (NR).

18. A terminal device, comprising the radio frequency structure according to claim 10.

* * * * *